June 3, 1930.     J. L. DRAKE     1,761,200
PROCESS AND APPARATUS FOR PRODUCING SHEET GLASS
Filed Oct. 29, 1927     3 Sheets-Sheet 1
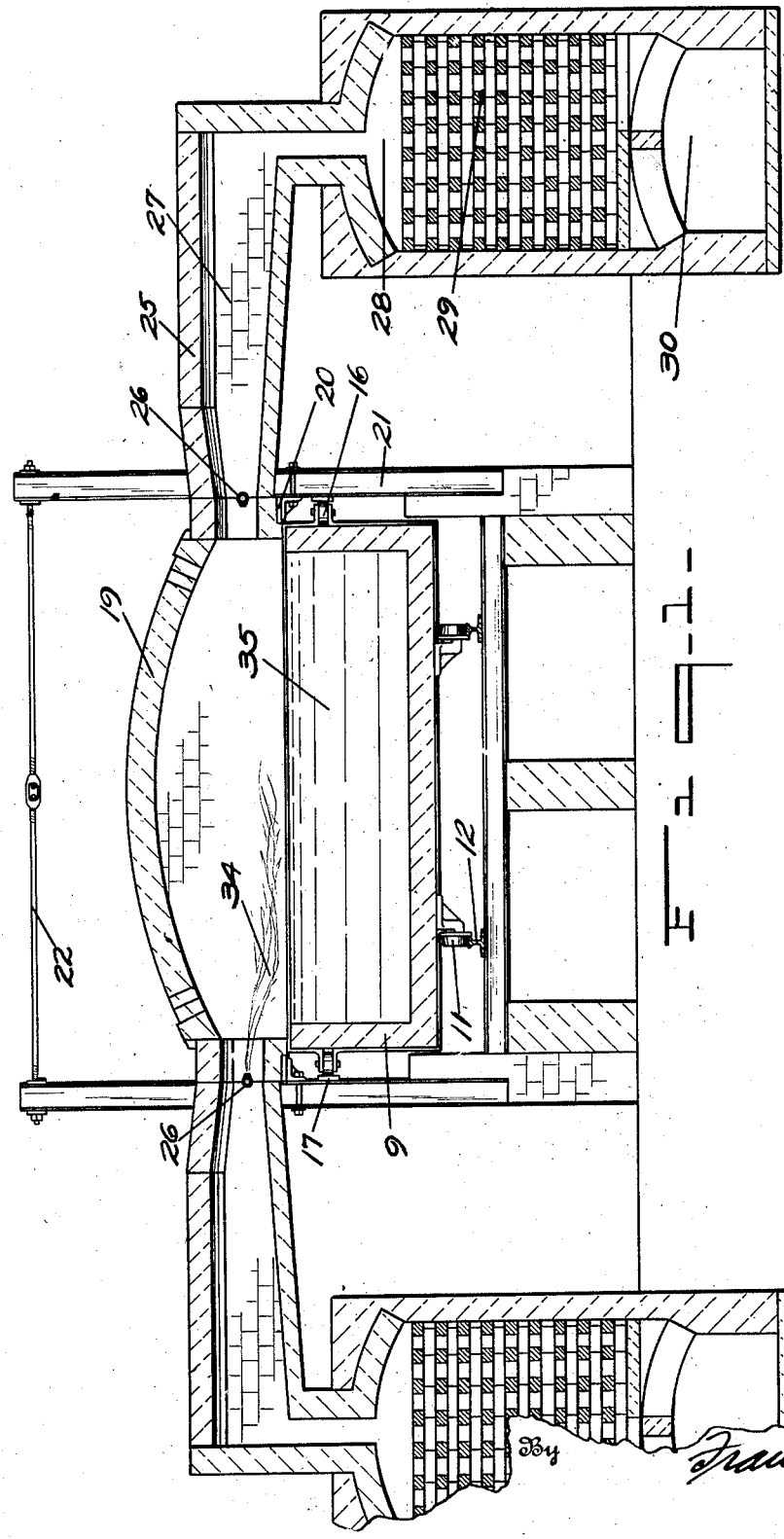
Inventor
John L. Drake
By Frank Fraser
Attorney June 3, 1930.  J. L. DRAKE  1,761,200
PROCESS AND APPARATUS FOR PRODUCING SHEET GLASS
Filed Oct. 29, 1927  3 Sheets-Sheet 2
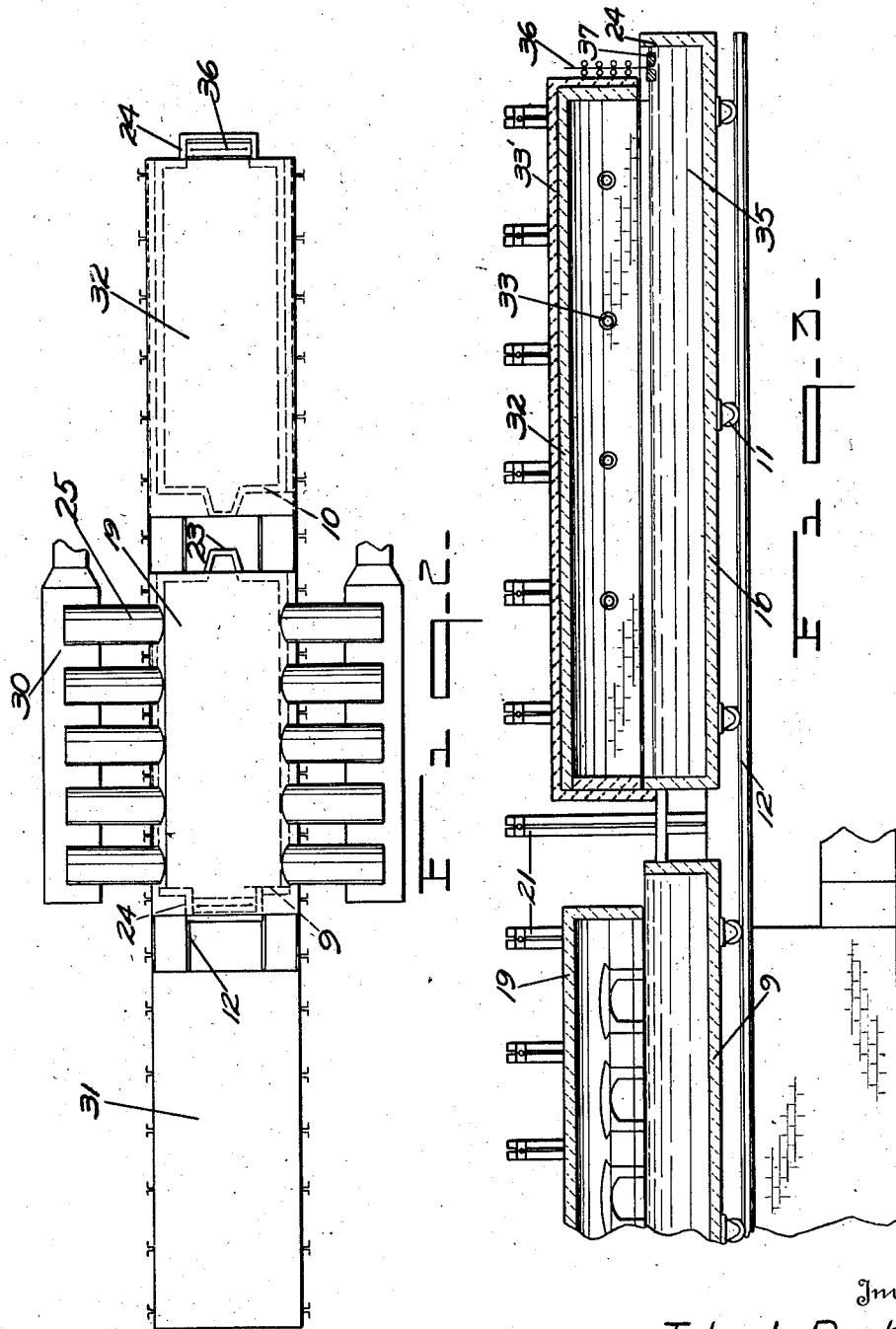
Inventor
John L. Drake
By Frank Fraser,
Attorney

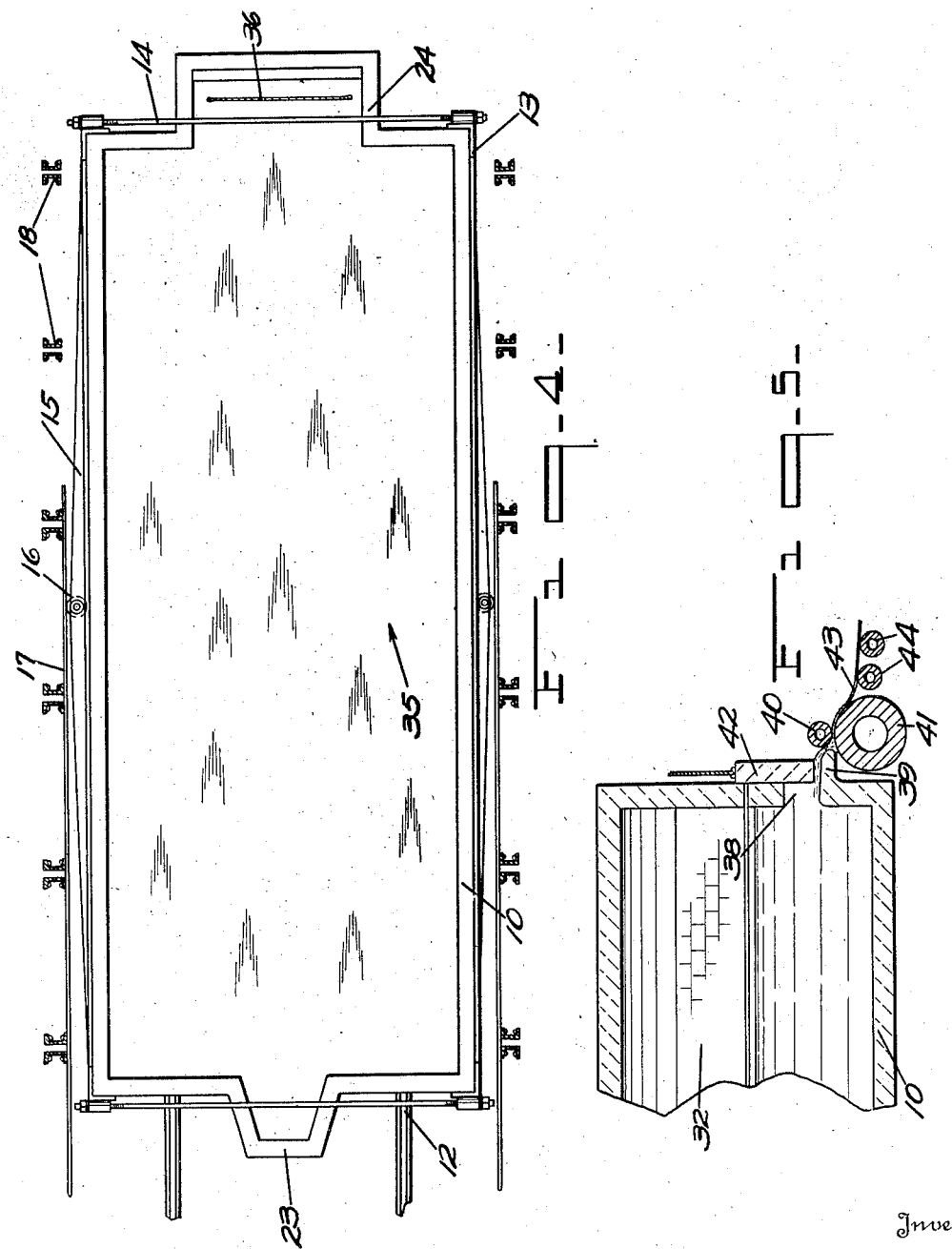

Patented June 3, 1930

1,761,200

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

PROCESS AND APPARATUS FOR PRODUCING SHEET GLASS

Application filed October 29, 1927. Serial No. 229,553.

The present invention relates to the glass art, and more particularly to a process and apparatus for producing sheet glass.

An important object of the invention is to provide a process and apparatus for producing sheet glass wherein the sheet is formed from molten glass which has been melted and refined while in a quiescent state to the end that the glass going to make up the sheet will be of good quality and substantially free from all common glass defects.

Another object of the invention is to provide a process and apparatus for producing sheet glass wherein a mass or body of molten glass is created within a suitable receptacle and then permitted to refine and settle therein for a considerable length of time before being formed into a sheet.

Another object is to provide a process and apparatus of this nature wherein glass batch ingredients are melted in a receptacle to produce a mass or body of molten glass, the glass being refined while in the same receptacle, and then continuously removed therefrom in sheet form.

A further object is to provide a process and apparatus of this nature wherein molten glass is melted and refined in the same receptacle while in a predetermined position after which the receptacle is removed from its melting and refining position to a position where the glass can be removed therefrom in sheet form.

Still another object is to provide a process and apparatus wherein are utilized a plurality of receptacles movable alternately to a melting position and a sheet forming position, a mass of molten glass being melted and refined in one receptacle while completely refined and settled molten glass is being removed from a second receptacle, the relative positions of the receptacles being changed at predetermined intervals so that glass may be removed from the first receptacle and additional glass melted in the second receptacle.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical transverse section through improved apparatus constructed in accordance with the present invention.

Fig. 2 is a top plan view thereof.

Fig. 3 is a vertical longitudinal section through a plurality of receptacles or tanks.

Fig. 4 is a plan view illustrating a tank in position to permit the removal of the molten glass therefrom, and Fig. 5 is a fragmentary sectional view of one type of sheet forming mechanism which may be used.

The present invention has for its aim the provision of means whereby a mass or body mass of molten glass being melted and refined while in a quiescent state in a manner such that the glass when introduced into a sheet or other article being formed therefrom will be of good quality and substantially free from all common glass defects. To this end, raw glass batch ingredients are adapted to be melted within a receptacle or tank and permitted to remain within the same receptacle for a considerable length of time so that it may completely refine and settle therein. After the glass has been completely refined and while it is still in the same receptacle, it is adapted to be formed into a sheet or other article.

In carrying out the above aim, there are provided preferably a plurality of receptacles or tanks movable alternately to a melting position and a sheet forming position, a mass of molten glass being melted and refined in one receptacle while completely refined and settled molten glass is being removed from a second receptacle. This is accomplished preferably by utilizng a single cap provided with stationary heating means, one of the receptacles being movable under the cap so that the heating means will effect the melting of a mass or body of molten glass therein. The receptacle is then permitted to remain in this position until the glass is completely refined and settled after which the same is removed therefrom to a position where the glass may be removed in sheet form. During the removal of the completely refined and settled glass from the first tank, a second tank is moved under the cap so that molten glass may be melted and refined therein. The relative positions of the tanks are then changed at predetermined intervals so that molten glass may be removed from the second tank and additional glass melted in the first tank.

The numerals 9 and 10 denote a pair of melting tanks or receptacles mounted upon wheels or the like 11 running upon a track system 12. Each receptacle or tank may be formed from the usual refractory clay blocks, as desired, and in such event, may be held together by means of the angle pieces 13 arranged at the corners thereof and connected together by the tie rods 14 as shown most clearly in Fig. 4. Extending longitudinally of the side walls of each tank are the brace members 15 carrying one or a plurality of rollers 16 adapted to engage the longitudinally extending plates or rails 17 carried by the upright members 18. Such an arrangement, as described, serves to prevent lateral movement of the tank during the travel thereof from its melting and refining position to its sheet forming position.

The track system 12 is so arranged that either of the tanks 9 or 10 may be moved under a stationary cap 19 preferably supported by means of angle pieces 20 carried by buckstays 21 connected at their upper ends by tie rods 22. Each tank is also preferably provided at one end thereof with an open compartment or dog-house 23 for receiving the glass batch ingredients while its opposite or working end may be reduced in width as at 24.

Stationary regenerators 25 are associated with the cap 19 at the opposite sides thereof, each regenerator including a gas pipe or burner 26 arranged within the passage 27, said passage communicating with a checker chamber 28 having arranged therein the brick checker work 29 through which air, provided by the tunnel 30, passes as is well understood in the art.

Arranged at the opposite ends of the cap 19 and preferably spaced therefrom are the auxiliary caps or housings 31 and 32, each having associated therewith burners or other suitable heating means 33 for controlling the temperature of the molten glass within the receptacles when the said receptacles are moved therebeneath. These caps may also be covered with suitable insulation as at 33'.

In the operation of the present invention, either one of the tanks 9 or 10 is placed in operative position under the cap 19 and the glass batch ingredients are introduced therein through the dog-house 23 thereof. The flames 34 issuing from the burners 26 may then be used to melt the batch whereby to reduce the same to a mass or body of molten glass 35. If the regenerative type of furnace is used, the flames will ordinarily be reversed from side to side at predetermined intervals as is the usual custom but of course, the present invention is not limited to this particular type of heating means.

After the molten glass has been produced within the tank, the temperature thereof is so controlled that the glass will be allowed to refine and settle therein, thus removing trapped gases which form seeds, blisters, etc. in the finished product with the result that when the tank is removed from beneath the cap 19 the molten glass therein will be of good quality and, practically speaking, free from all common glass defects.

After the molten glass has been completely refined and settled, the tank is moved from under the cap 19 and under either of the auxiliary caps 31 or 32 in a manner such that the reduced working end 24 thereof will project beyond the end of the respective housing or cap so that the glass may be removed therefrom in sheet form as at 36 or in the form of any other glass article. The sheet can be formed in any desired manner such as by using the Colburn type of machine wherein the sheet will be drawn upwardly from the surface of the molten glass and then deflected about a bending member or roll into the horizontal plane. If desired, however, the sheet can be drawn in accordance with the so-called Fourcault process as more clearly illustrated in Fig. 3 and wherein a slotted member or deputer 37 is disposed within the molten glass to form a sheet source under hydrostatic pressure, the sheet being drawn from this sheet source and annealed while traveling vertically.

As a sheet is being formed from the completely refined molten glass in one tank, the other tank is moved into operative position under the cap 19 and glass batch ingredients are melted therein to produce a mass or body of molten glass. The amount of glass made in either tank at one time is preferably such that a continuous sheet 31 may be formed therefrom during the time the second tank is being prepared. The second tank is then moved from under the cap 19 and the first tank is replaced thereunder so that additional glass may be produced therein, this cycle of operations being continued as long as desired.

In other words, while completely refined molten glass is being removed from one tank, molten glass is being produced in the second tank after which the relative positions of the tanks are changed and the glass removed from the second tank while additional glass is being prepared in the first tank. The tanks are preferably of such a capacity that only a few inches of the molten glass will be removed therefrom during the time it is in its drawing or sheet forming position and it is desirable that the position of the tanks be changed about once every twenty-four hours. That is to say, completely refined molten glass will be removed from one tank for twenty-four hours while this period of time is given to the melting and refining of the glass in the other tank.

It is of course not essential that the glass by drawn from the tanks but instead, it may be flowed therefrom to sheet rolling mechanism such as shown in Fig. 5. In such case, the tank would be provided adjacent its bottom wall with an outlet 38 through which the glass would flow over a lip 39 and between the rolls 40 and 41, the flow of glass being controlled by an adjustable gate 42. The resultant sheet 43 could then be carried away upon a plurality of rolls 44 into an annealing leer, not shown.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described, a movable receptacle, a main cap under which said receptacle is movable, heating means associated with said cap for establishing a mass of molten glass within said receptacle, an auxiliary cap for receiving the receptacle and glass thereunder after the said glass has been melted and refined, and means for forming a continuous sheet from the glass in said receptacle while under the auxiliary cap.

2. In apparatus of the character described, a pair of receptacles, a main cap and a pair of auxiliary caps, one of said receptacles being receivable under the main cap and the other under one of said auxiliary caps, heating means associated with the main cap for producing a mass of molten glass in the receptacle thereunder, and means for forming a sheet from molten glass contained within the receptacle under the auxiliary cap.

3. In apparatus of the character described, a pair of receptacles, a main cap and a pair of auxiliary caps, one of said receptacles being receivable under the main cap and the other under one of said auxiliary caps, heating means associated with the main cap for producing a mass of molten glass in the receptacle thereunder, means for forming a sheet from molten glass contained within the receptacle under the auxiliary cap, and means by which the relative positions of said receptacles may be changed at predetermined intervals.

4. In apparatus of the character described, a pair of caps, and a receptacle adapted to contain molten glass movable first to a position under one cap and then to a position under the other cap.

5. In apparatus of the character described, a pair of caps, a receptacle adapted to contain molten glass movable first to a position under one cap and then to a position under the other cap, means for establishing a mass of molten glass in the receptacle while under one cap, and means for removing the molten glass from said receptacle while under the other cap.

6. In apparatus of the character described, a pair of caps, a receptacle adapted to contain molten glass, rails upon which said receptacle is mounted and along which the same is movable alternately first to a position under one cap and then to a position under the other cap, means for establishing a mass of molten glass in the receptacle while under one cap, and means for removing the molten glass from the receptacle while under the other cap.

7. In apparatus of the character described, a main cap and a plurality of auxiliary caps, and a plurality of receptacles adapted to contain molten glass, one receptacle being provided for each auxiliary cap and movable alternately to the position first under the main cap and then to a position under its respective auxiliary cap.

8. In apparatus of the character described, a main cap and a plurality of auxiliary caps, and a plurality of receptacles adapted to contain molten glass, one being provided for each auxiliary cap and movable alternately to the position first under the main caps and then to a position under its respective auxiliary caps, means for establishing a mass of molten glass in each receptacle while under the main cap, and means for removing the glass from the receptacle while under its auxiliary cap.

9. In apparatus of the character described, a movable receptacle, a cap under which said receptacle is movable, heating means associated with said cap for establishing a mass of molten glass within said receptacle, a second cap for receiving the receptacle and glass thereunder after the said glass has been melted and refined, and means for removing the glass from said receptacle while under said second-named cap.

10. In apparatus of the character described, a movable tank, a cap under which said tank is movable, heating means associated with said cap for establishing a mass of molten glass within said tank, a second cap for receiving the tank and glass thereunder after the said glass has been melted and refined, said tank cooperating with said caps to substantially enclose the molten glass therein, and means for removing the glass from the tank when under the second-named cap.

11. In apparatus of the character described, a movable receptacle, a cap under which said receptacle is movable, heating means associated with said cap for establishing a mass of molten glass within said receptacle, a second cap for receiving the receptacle and glass thereunder after said glass has been melted and refined, wheels carried by said receptacle, and tracks upon which said wheels are mounted and along which the receptacle is run from one cap to the other.

Signed at Toledo, in the county of Lucas and State of Ohio, this 27th day of October, 1927.

JOHN L. DRAKE.